United States Patent [19]
Hermann et al.

[11] Patent Number: 5,011,163
[45] Date of Patent: Apr. 30, 1991

[54] FLAME-RESISTANT ELASTIC SEALING MEMBER

[75] Inventors: Dietmar Hermann, Garbsen; Helmbrecht Schmidt, Niestetal-Sandershausen, both of Fed. Rep. of Germany

[73] Assignee: Continental Aktiengesellschaft, Hanover, Fed. Rep. of Germany

[21] Appl. No.: 410,072

[22] Filed: Sep. 20, 1989

[30] Foreign Application Priority Data

Sep. 20, 1988 [DE] Fed. Rep. of Germany ....... 3831894

[51] Int. Cl.$^5$ .......................... F16J 9/00; F02F 11/00
[52] U.S. Cl. ...................................... 277/26; 277/227; 277/229
[58] Field of Search ...................... 277/26, 235 A, 227, 277/229; 428/920, 921

[56] References Cited

U.S. PATENT DOCUMENTS

| | | | |
|---|---|---|---|
| 2,165,296 | 7/1939 | Oass | 277/229 |
| 3,535,824 | 10/1970 | Kessler | 49/488 |
| 3,754,982 | 8/1973 | Chapin | 428/921 |
| 3,869,132 | 3/1975 | Taylor et al. | 277/26 |
| 3,918,726 | 11/1975 | Kramer | 277/227 |
| 4,401,491 | 8/1983 | Modic | 428/921 |
| 4,453,723 | 6/1984 | Greenwald | 277/165 |
| 4,486,468 | 12/1984 | Gray | 428/921 |
| 4,529,653 | 7/1985 | Hargreaves et al. | 277/227 |
| 4,588,523 | 5/1986 | Tashlick et al. | 428/921 |
| 4,647,500 | 3/1987 | George et al. | 428/921 |
| 4,729,853 | 3/1988 | von Bonin | 428/921 |
| 4,810,565 | 3/1989 | Wasitis et al. | 428/920 |
| 4,811,529 | 3/1989 | Harris et al. | 277/227 |
| 4,824,727 | 4/1989 | Balian et al. | 428/921 |

*Primary Examiner*—Allan N. Shoap
*Assistant Examiner*—Daniel G. DePumpo
*Attorney, Agent, or Firm*—Robert W. Becker & Associates

[57] ABSTRACT

A flame-resistant sealing member of rubber or rubber-like synthetic material having a flame-retarding additive in only a thin surface layer, so that the overall elasticity of the sealing member is not adversely affected.

9 Claims, 1 Drawing Sheet

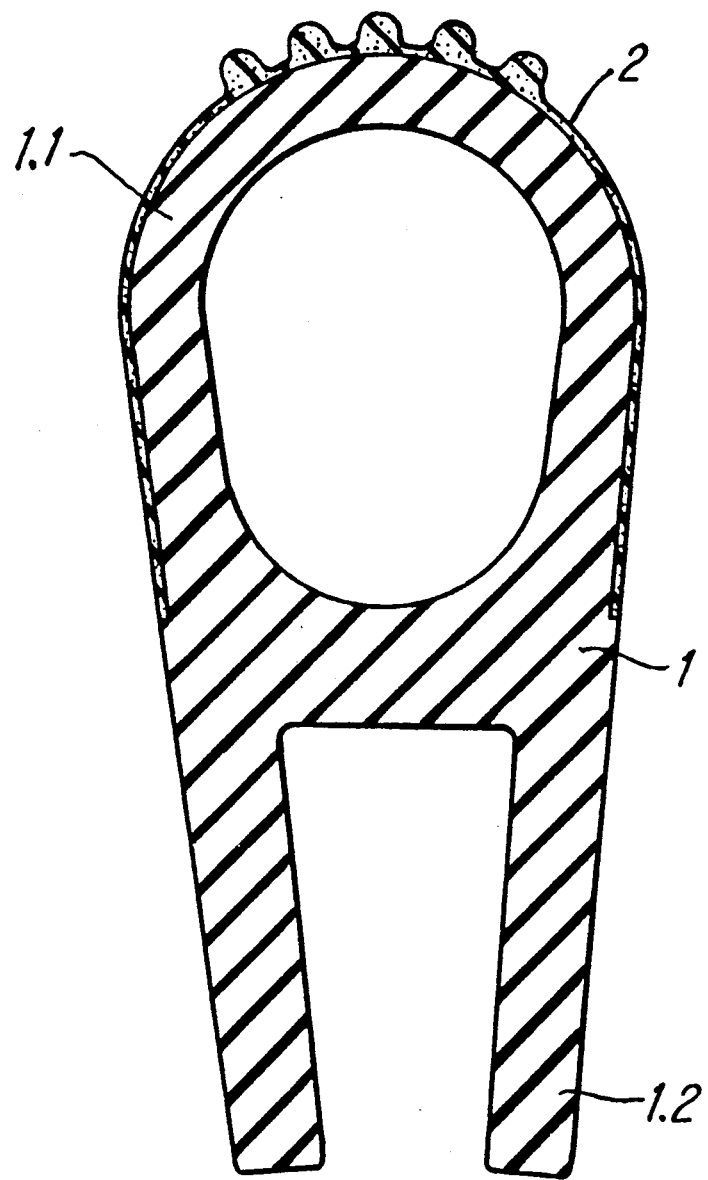

FLAME-RESISTANT ELASTIC SEALING MEMBER

BACKGROUND OF THE INVENTION

1. Field of the Invention

The present invention relates to a flame-resistant or not easily flammable, elastic sealing member of rubber or rubber-like synthetic material that, by using known flame retardant or fireproofing additives, fulfills the criteria of pertinent standards.

2. Description of the Prior Art

A large number of varieties of such sealing members are known, not only in continuous, especially annular, form, but also in the form of sealing strips, especially profiled sealing members that are formed by extrusion. To achieve the flame-resistant properties that are established by various standards, added to the rubber or plastic from which the sealing members are made is a fireproofing agent that is coordinated with the pertaining rubber or plastic, or a fireproofing system that comprises one or more substances that complement one another. A large number of fireproofing agents that are suitable in any given case are known and do not themselves form the subject matter of the present invention.

In connection with the safety rules that in the last few years have constantly been tightened up in the building industry and the transportation field, especially with regard to public buildings as well as private and public means of transportation, the requirements regarding the flame resistance of all flammable parts for devices and other equipment used in these fields was also considerably increased. Today, especially for the standard installation in motor vehicles, generally only such parts are permitted that comply with the strict standards of the pertinent U.S. standards ASTM 542/82 and NFPA 258/76. In order to meet these standards, rubber and plastic parts, and in particular also elastic sealing members of such materials, must be provided with considerable quantities of fireproofing agent, as a result of which their original flexibility or elasticity, which of course is still required in order for the sealing members to fulfill their specific function, is considerably compromised.

It is therefore an object of the present invention to provide an elastic sealing member that simultaneously is not only highly elastic and flexible, but is also flame-resistant in conformity with the aforementioned strict U.S. standards.

BRIEF DESCRIPTION OF THE DRAWING

This object, and other objects and advantages of the present invention, will appear more clearly from the following specification in conjunction with the accompanying schematic drawing, which is a greatly enlarged cross-sectional view of one exemplary embodiment of an inventive sealing member.

SUMMARY OF THE INVENTION

Although pursuant to the present expert state of knowledge it would appear impossible to simultaneously realize the aforementioned characteristics in an economical and technically practical manner, the stated object can surprisingly be realized with a sealing member that is characterized primarily in that in only a thin surface layer is the body of the sealing member provided with flame retardant additives, whereas the remainder of the body of the sealing member is essentially free of such additives.

Since sealing members are frequently installed in such a way that they are disposed against angularly recessed edges of elements or are placed in groove-like recesses, so that a portion of the surface of the sealing member is always covered by fixed, non-flammable wall portions, the inventive sealing member is preferably provided with a flameretarding surface layer only on those parts that are exposed in the installed state of use.

It has surprisingly been shown that a thickness of the flame-retarding surface layer in a range of only 0.5 to 5 mm, and preferably in a range of 1 to 3 mm, is sufficient to satisfy the applicable flame-resistance requirements of profiled sealing member cross-sections that are, for example, standard in the motor vehicle industry, whereby the elasticity and flexibility of the sealing members that is necessary for them to fulfill their sealing function is entirely maintained.

For particular profiled shapes or dimensions, it can be expedient, in place of or in addition to the previously indicated dimensioning rules for the thickness of the flame-retarding surface layers, to coordinate the thickness thereof with the thickness of the material of the pertaining part of the sealing member section, and in particular in such a way that the thickness of the surface layer is in a range of 5 to 20%, and preferably in a range of 10 to 15%, of the indicated material thickness.

The present invention is of particular advantage when used with extruded profiled strips such as those widely used in the motor vehicle industry, in which connection the inventive flame-resistant surface layer of the profiled strip is preferably produced via coextrusion. In another particularly advantageous specific embodiment of the present invention, such profiled strips are provided with a flame-resistant surface layer in the form of a foil-like strip that is continuous in the longitudinal direction of the profile and that is fixedly connected to the body of the profiled sealing member, in particular being vulcanized thereto, with the foil strip preferably being embedded in the body of the sealing member in such a way that it is flush with the surface thereof.

Further specific features of the present invention will be described in detail subsequently.

DESCRIPTION OF PREFERRED EMBODIMENTS

Referring now to the drawing in detail, the illustrated exemplary embodiment of an inventive sealing member, for example a profiled sealing member produced by extrusion, is provided with a body 1 that is formed in a customary manner from an elastomeric material; the base portion 1.2 of the body 1 of the sealing member can be disposed in a groove. The actual sealing portion 1.1, which extends out of the groove, has a tube-like configuration in the illustrated embodiment, and can be exposed to flames in the event of a fire, is provided pursuant to the present invention with a thin surface layer 2, the basic formulation of which corresponds extensively to that of the body 1 of the sealing member, although the surface layer 2 contains a very high percentage of flame-retardant or fireproofing agent, for example a mixture that predominantly comprises hydrated aluminum oxide, i.e. alumina trihydrate, with additives of antimony trioxide and zinc borate. Due to the high proportion of fireproofing or flameproofing agent, which for example with a rubber sealing member having a base of chloroprene is, per 100 parts by weight rubber, preferably in a range of 100 to 150 parts by weight of a mixture of alumina trihydrate, antimony trioxide, and zinc borate, the surface layer 2 is relatively nonelastic and stiff, which, however, due to its slight thickness, has practically no effect upon the overall elasticity and flexibility of the sealing member.

The present invention is, of course, in no way restricted to the specific disclosure of the specification and drawing, but also encompasses any modifications within the scope of the appended claims.

What we claim is:

1. A flame-resistant, elastic sealing member comprising: a strip-like body of a given length and made from a material selected from the group consisting of rubber and rubber-like synthetic material, said body having opposing side surfaces that extend the length of the body and are spaced apart by a given width, said body having a bottom for supporting the body on a support surface, said body further having a top surface that bridges said opposing side surfaces, said body further defining an upper sealing portion and a lower base portion, said side surfaces being divided into an upper section and a lower section, said upper sealing portion including said top surfaces and said upper section of said opposing side surfaces, said lower base portion including said bottom and said lower section of said opposing side surfaces, said lower base portion being for disposal in a groove having said support surface and wherein said groove is defined by opposing side walls, said upper sealing portion having a continuous fire protecting surface layer thereover covering said top surface and said upper section of said opposing side surfaces, said protecting surface layer containing therethrough flame-retarding additives to make said upper sealing portion flame-resistant, said layer ending at a location defining the demarcation between said upper sealing portion and said lower base portion so that said lower section of said side surfaces is devoid of said fire protecting surface layer, said sealing member being for disposal in said groove so that said lower base portion from said bottom to said demarcation is covered and thereby protected by said side walls of said groove along said lower section of said side surface.

2. An elastic sealing member according to claim 1, in which said surface layer has a thickness of from 0.5 to 5 mm.

3. An elastic sealing member according to claim 2, in which said surface layer has a thickness of from 1 to 3 mm.

4. An elastic sealing member according to claim 1, in which said surface layer has a thickness that is 5 to 20% of the thickness of the material of the body it covers.

5. An elastic sealing member according to claim 4, in which said surface layer has a thickness that is 10 to 15% of the thickness of the material of the body it covers.

6. An elastic sealing member according to claim 1, which is an extruded profiled strip, with said flame-retarding surface layer being produced by coextrusion.

7. An elastic sealing member according to claim 2, in which said body thereof is an extruded profiled strip, with said flame-retarding surface layer being a foil-like strip.

8. An elastic sealing member according to claim 7, in which said foil-like surface layer strip vulcanized to said profiled body strip.

9. An elastic sealing member according to claim 7, in which the surface of said foil-like strip is flush with the surface of said lower section.

* * * * *